United States Patent
Tanaka et al.

(10) Patent No.: US 7,361,884 B2
(45) Date of Patent: Apr. 22, 2008

(54) POLARIZATION INDEPENDENT OPTICAL ISOLATOR AND OPTICAL TRANSMITTING/RECEIVING APPARATUS

(75) Inventors: Hiromasa Tanaka, Kawasaki (JP); Kazuyuki Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/652,508

(22) Filed: Jan. 12, 2007

(65) Prior Publication Data
US 2008/0042050 A1 Feb. 21, 2008

(30) Foreign Application Priority Data
Aug. 14, 2006 (JP) .............. 2006-221207

(51) Int. Cl.
*G02B 5/30* (2006.01)
*G02B 6/00* (2006.01)
(52) U.S. Cl. .............. 250/225; 359/484; 359/494; 385/11
(58) Field of Classification Search .............. 250/225, 250/216, 227.11, 239; 359/281, 483–484, 359/494–500; 385/11, 31, 88, 92; 396/65, 396/72; 372/703
See application file for complete search history.

(56) References Cited
U.S. PATENT DOCUMENTS
2003/0184861 A1* 10/2003 Ikari .............. 359/484

FOREIGN PATENT DOCUMENTS
JP 05-341229 12/1993
JP 07-253559 10/1995
JP 09-018422 1/1997

\* cited by examiner

*Primary Examiner*—Kevin Pyo
(74) *Attorney, Agent, or Firm*—Staas & Halsey LLP

(57) ABSTRACT

A polarization independent optical isolator includes: a first birefringent plate that divides the receiver light from the optical transmission path into normal light and abnormal light to output the normal light and the abnormal light; a second birefringent plate that combines the normal light and the abnormal light to output the combined light to the light receiving element; an optical rotation unit that is disposed between the first birefringent plate and the second birefringent plate, rotates the polarization direction of the normal light and the abnormal light which are outputted from the first birefringent plate by substantially 90° and outputs the rotated light, and outputs the reflected light of the receiver light in a state where the polarization direction of the reflected light is not rotated; and a polarizing element that is disposed between the optical rotation unit and the second birefringent plate, allows one of the normal light and the abnormal light which are inputted from the optical rotation unit to pass therethrough and to be inputted to the second birefringent plate, and outputs the transmitter light inputted from the light emitting element to the optical rotation unit.

3 Claims, 11 Drawing Sheets

POLARIZATION INDEPENDENT OPTICAL ISOLATOR AND OPTICAL TRANSMITTING/RECEIVING APPARATUS

BACKGROUND OF THE INVENTION

1. Field of the Invention

The present invention relates to a polarization independent optical isolator and an optical transmitting/receiving apparatus, and more particularly, to an LD/PD (laser diode/ photo diode) integrated optical device in an optical module that is used in a communication system which transmits and receives a signal through a single line bi-directionally.

2. Description of the Related Art

In recent years, a PON (passive optical network) system has been widely employed in an optical fiber access network. The PON system is a communication network in which an optical signal from an OLT (optical line terminal) serving as a base station side device is split by a star coupler, and then shared by a plurality of subscriber side devices ONU (optical network unit). A down signal from the OLT is used with a wavelength of 1.55 μm band, and an up signal from the ONU is used with a wavelength of 1.3 μm band.

As an optical module for the PON, there is used an LD/PD integrated optical device (BIDI (bi-directional) optical transmitting and receiving module) as shown in FIG. 2. In the BIDI optical transmitting and receiving module, the LD that constitutes a transmitter section and the PD that constitutes a receiver section are generally received within a CAN type package. Also, transmitter light and receiver light are divided by a wavelength division element that is called "WDM (wavelength division multiplexing) filter" by using a difference between the wavelength of the transmitter light and the wavelength of the receiver light.

In order to expand the capacity of transmission in the future, there has been studied a WDM-PON system in which an optical signal of one wavelength is allocated to each of subscribes by means of a technique of multiplexing optical signals that are different in the wavelength, and transmitting the optical signals through one optical fiber. In the WDM-PON, the LD/PD integrated optical device (BIDI optical transmitting and receiving module) in the case where the bi-directional communication is conducted with the same wavelength becomes essential in the future because the wavelengths of the optical signals that are transmitted or received are identical with each other.

In the WDM-PON, the transmitter light and the receiver light are identical in the wavelength with each other. For that reason, it is impossible to apply a wavelength division element (WDM filter) shown in FIG. 2. Therefore, the WDM filter is replaced by the polarization independent optical isolator.

As shown in FIG. 3, the polarization independent optical isolator includes first and second birefringent plates 1 and 4, a Faraday element (Faraday rotator) 2, and a λ/2 plate 3. Referring to FIG. 3, transmitter light from the LD is linearly polarized in a y-direction. Also, arbitrary linearly polarized light is assumed as receiver light that is received by the PD, and has both of a y-component and an x-component. In addition, a magnetic field is applied to the Faraday element 2 in a z-direction.

FIG. 4 is a diagram showing light polarization states when the light has passed through the respective elements of the optical isolator. Referring to FIG. 3, the light from the LD (transmitter light: indicated by the solid arrow in FIG. 3) is rotated by 45 degrees with respect to a light traveling direction by means of the λ/2 plate 3 (FIG. 4[B]) after having passed through the second birefringent plate 4 (FIG. 4[A]). Then, the polarization direction of the transmitter light is rotated by 45 degrees with respect to a direction of the magnetic field by means of the Faraday element 2 (FIG. 4[C]). As a result, the polarization direction returns to a state of the light when the light is outputted from the LD. After that, the transmitter light passes through the first birefringent plate 1 and is coupled into the optical fiber.

On the other hand, light from the optical fiber side (receiver light: indicated by the dashed arrow in FIG. 3) is divided into normal light and abnormal light which are perpendicular in the polarization direction to each other (orthogonal: refer to FIG. 4[D]) by means of the first birefringent plate 1, the normal light (upper side of FIG. 3) goes straightly and is outputted, and the abnormal light (lower side of FIG. 3) is outputted from a position that is translated by a given distance d from an output point of the normal light. The Faraday element 2 rotates the polarization directions of the normal light and the abnormal light by 45 degrees with respect to the direction of the magnetic field (FIG. 4[E]). After that, the receiver light (the normal light and the abnormal light) is rotated by 45 degrees with respect to the light traveling direction when passing through the λ/2 plate 3 (FIG. 4[F]). After that, the normal light and the abnormal light are polarized and combined together by the second birefringent plate 4, and then received by the PD.

The transmitter light and the receiver light can be divided from each other by means of the above-described polarization independent optical isolator in principle. However, in an actual optical module, the LD and the PD are received in the individual CAN type packages, respectively. Herein, when those two CAN type packages are disposed in parallel, those packages must be so disposed as to be out of contact with each other. As a result, in the case where those CAN type packages are disposed in parallel, it is necessary to ensure a longer distance than the sum of the radius of the CAN type package (LD package) of the LD and the radius of the CAN type package (PD package) of the PD as a distance d1 (FIG. 3) between the optical axes of the receiver light and the transmitter light. Then, it is necessary to prepare an optical isolator that divides the receiver light into the normal light and the abnormal light by a light beam distance d corresponding to the distance d1.

On the contrary, up to now, as in Prior Art 1 shown in FIG. 5, the first birefringent plate 1 and the second birefringent plate 4 are thickened to extend the distance d, to thereby ensure the light beam distance d1. Alternatively, as in Prior Art 2 shown in FIG. 6, the LD package and the PD package are so disposed as to be orthogonal to each other, and a reflecting mirror 5 that bends an optical path at a right angle is disposed between the LD package and the second birefringent plate 4, to thereby prevent the distance d from being extended.

FIG. 7 shows a structural example of an optical device (BIDI) to which Prior Art 2 is applied. As shown in FIG. 7, the respective elements 1 to 5 are adhered to each other so as to shorten the length in the optical path direction. In this case, when the respective lengths of the first birefringent plate 1, the Faraday element 2, the λ/2 plate 3, the second birefringent plate 4, and the reflecting mirror 5 in the optical path direction (horizontal length in FIG. 7) are set to, for example, 1.25 mm, 3.3 mm, 0.2 mm, 1.25 mm, and 0.2 mm or lower, the light beam distance between the transmitter light and the receiver light can be set to 0.125 mm.

Also, as the prior art documents related to the present invention, there are the inventions disclosed in the following documents.

[Patent document 1] JP 5-341229 A
[Patent document 2] JP 7-253559 A
[Patent document 3] JP 9-18422 A However, the method of Prior Art 1 causes a problem in that the optical device is upsized as much as the increased thicknesses of the first birefringent plate 1 and the second birefringent plate 4. On the other hand, in the method of Prior Art 2, as shown in FIG. 7, the PD package and the LD package must be so disposed as to be orthogonal to each other so that the PD package and the LD package come out of contact with each other. FIG. 7 exemplifies the approximate sizes of the LD package and the PD package. In the example shown in FIG. 7, the width length (diameter) of a light transmitting portion (CAN portion) in the LD package is 4.2 mm, and the width length (diameter) of a light receiving portion (CAN portion) in the PD package is 4.0 mm. As shown in FIG. 7, even in the case where the PD package and the LD package are disposed to be orthogonal to each other so that those packages come as close as possible to each other in a non-contact state, a distance must be provided in consideration of the radius of the LD package between the reflecting mirror 5 and the PD package. In the example shown in FIG. 7, it is necessary to provide a distance of about 2 mm between the center of the reflecting mirror 5 and the PD package surface. Thus, in Prior Art 2, there arises a problem in that the optical device cannot be reduced in the size for the prevention of a physical interference (contact) between the LD package and the PD package.

SUMMARY OF THE INVENTION

An object of the present invention is to provide a polarization independent optical isolator which is capable of downsizing an optical transmitting and receiving module.

The present invention adopts the following means in order to solve the above-mentioned problem.

That is, according to a first aspect of the present invention, there is provided a polarization independent optical isolator, which introduces receiver light inputted from an optical transmission path into a receiving element; prevents reflected light of the receiver light from being inputted to the optical transmission path; and introduces transmitter light inputted from a light emitting element into the optical transmission path in a state where the transmitter light inputted from the light emitting element is not received in the light receiving element, the polarization independent optical isolator including:

a first birefringent plate that divides the receiver light inputted from the optical transmission path into normal light and abnormal light to output the normal light and the abnormal light;

a second birefringent plate that combines the normal light and the abnormal light which are divided by the first birefringent plate to output the combined light to the light receiving element;

an optical rotation unit that is disposed between the first birefringent plate and the second birefringent plate, rotates the polarization direction of the normal light and the abnormal light which are outputted from the first birefringent plate by substantially 90° and outputs the rotated light, and outputs the reflected light of the receiver light which is divided into the normal light and the abnormal light by the second birefringent plate in a state where the polarization direction of the reflected light is not rotated; and a polarizing element that is disposed between the optical rotation unit and the second birefringent plate, allows one of the normal light and the abnormal light which are inputted from the optical rotation unit to pass therethrough and to be inputted to the second birefringent plate, and outputs the transmitter light inputted from the light emitting element to the optical rotation unit.

Further, according to a second aspect of the present invention, there is provided an optical transmitting/receiving apparatus, including:

an optical transmission path;

a light receiving element that receives receiver light from the optical transmission path;

a light emitting element that outputs transmitter light to be inputted to the optical transmission path; and a polarization independent optical isolator that includes: a first birefringent plate that divides the receiver light inputted from the optical transmission path into normal light and abnormal light to output the normal light and the abnormal light; a second birefringent plate that combines the normal light and the abnormal light which are divided by the first birefringent plate to output the combined light to the light receiving element; an optical rotation unit that is disposed between the first birefringent plate and the second birefringent plate, rotates the polarization direction of the normal light and the abnormal light which are outputted from the first birefringent plate by substantially 90° and outputs the rotated light, and outputs the reflected light of the receiver light which is divided into the normal light and the abnormal light by the second birefringent plate in a state where the polarization direction of the reflected light is not rotated; and a polarizing element that is disposed between the optical rotation unit and the second birefringent plate, allows one of the normal light and the abnormal light which are inputted from the optical rotation unit to pass therethrough and to be inputted to the second birefringent plate, and outputs the transmitter light inputted from the light emitting element to the optical rotation unit.

In the second aspect of the present invention, it is preferable that the light receiving element be received in a first CAN type package, the light emitting element be received in a second CAN type package, and the first CAN type package and the second CAN type package be disposed to be substantially orthogonal to each other in a non-contact state.

Also, the present invention can be specified as a polarization independent optical isolator, including:

a first end surface having an input point of the receiver light from the optical transmission path and an output point from the transmitter light from a light source;

a second end surface having an output point of the receiver light which outputs the receiver light with an optical axis that is in parallel with an optical axis of the receiver light inputted to the input point of the receiver light; and an input surface of the transmitter light from the light source which is disposed at an intermediate portion between the first end surface and the second end surface.

According to the present invention, there can be provided the polarization independent optical isolator which is capable of downsizing the optical transmitting and receiving module.

DETAILED DESCRIPTION OF THE PREFERRED EMBODIMENTS

Hereinafter, a description will be given of embodiments of the present invention with reference to the accompanying drawings. Structures of the embodiments are examples, and the present invention is not limited thereto.

First Embodiment

Figure 8:
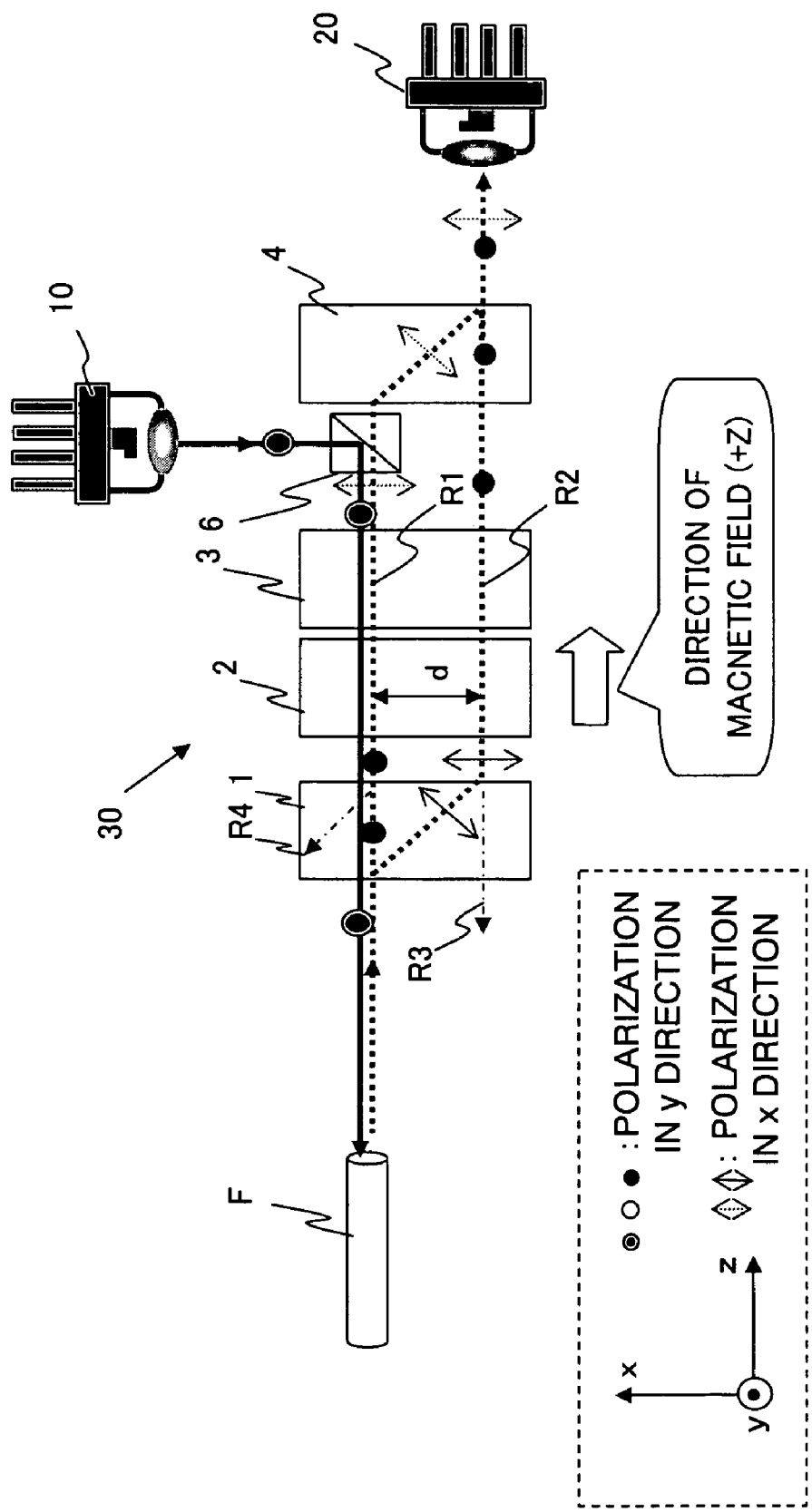
FIG. 8 is a diagram showing a structural example of an optical transmitting/receiving apparatus including the polarization independent type isolator according to a first embodiment of the present invention.

FIG. 8 is a diagram showing a structural example of an optical device (optical transmitting/receiving apparatus) according to a first embodiment of the present invention. Referring to FIG. 8, the optical transmitting/receiving apparatus includes an optical fiber F as an optical transmission path, a CAN type package (hereinafter referred to as "LD package") 10 (corresponding to a second CAN type package) which receives an LD as a light emitting element (light source), a CAN type package (hereinafter referred to as "PD package") 20 (corresponding to a second CAN type package) which receives a PD as a light receiving element, and a polarization independent optical isolator 30 (hereinafter referred to as "optical isolator 30").

The optical isolator 30 includes a first birefringent plate 1 (hereinafter referred as "birefringent plate 1"), a Faraday element (Faraday rotator) 2, a λ/2 plate (½ wavelength plate) 3, a polarization beam splitter 6 (corresponding to a polarization element of the present invention), and a second birefringent plate 4 (hereinafter referred to as "birefringent plate 4"), which are aligned in an optical axial direction (horizontal direction in FIG. 8) of the receiver light that is outputted from the optical fiber F.

That is, the optical isolator 30 has an optical rotation unit composed of the Faraday element 2 and the λ/2 plate 3 disposed between the birefringent plate 1 and the birefringent plate 4, and has a polarization beam splitter 6 that is a polarization element disposed between the optical rotation unit and the birefringent plate 4.

The PD package 20 is disposed in parallel with the optical axis of the optical fiber F, and the PD that is received in the PD package 20 is disposed on the optical axis that is located at a position to which the optical axis of the receiver light that is outputted from the optical fiber F is translated by a given distance d. The LD package 10 is disposed in a direction that is substantially orthogonal to the PD package 20, and disposed so that the transmitter light from the LD is inputted to the polarization beam splitter 6 at a position opposite to the polarization beam splitter 6.

The optical fiber F, the LD package 10, and the PD 20 which are identical with those described in Prior Art 2 are applied. Also, in the optical isolator 30, the materials and functions of the birefringent plates 1 and 4, the Faraday element 2, and the λ/2 plate 3 which are identical with those described in the prior art except for the polarization beam splitter 6 can be applied.

Referring to FIG. 8, an arbitrary linear polarization is assumed as the receiver light that is received by the PD, and the receiver light includes both of an x-component and a y-component. Also, the transmitter light from the LD is linearly polarized in the y-direction. In addition, a magnetic field is applied to the Faraday element 2 in a z-direction.

The receiver light that is outputted from the optical fiber F (indicated by the dashed arrow in FIG. 8) is inputted to an end surface (a first end surface) of the birefringent plate 1. The birefringent plate 1 divides the inputted receiver light into normal light (ordinary light) R1 that is orthogonal to the polarization direction and abnormal light R2. The normal light R1 is linearly outputted whereas the abnormal light R2 is refracted and outputted from a position that is apart downward from the normal light R1 in parallel by the distance d. The normal light R1 at the time of being outputted from the birefringent plate 1 is polarized in the y-direction, and the abnormal light R2 is polarized in the x-direction (refer to FIG. 4D).

Figure 1:
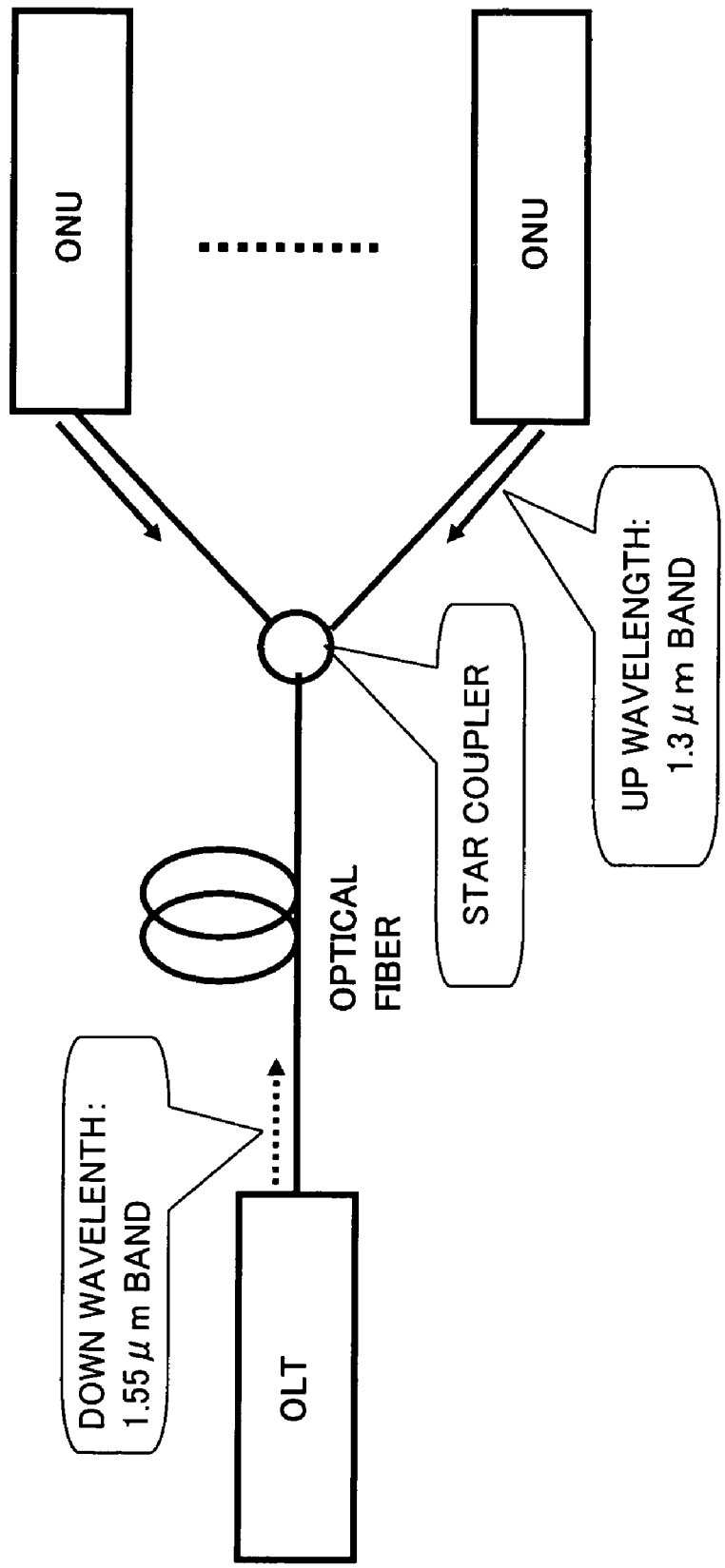
FIG. 1 is a diagram showing an example of an optical network to which a PON system is applied.
Figure 2:
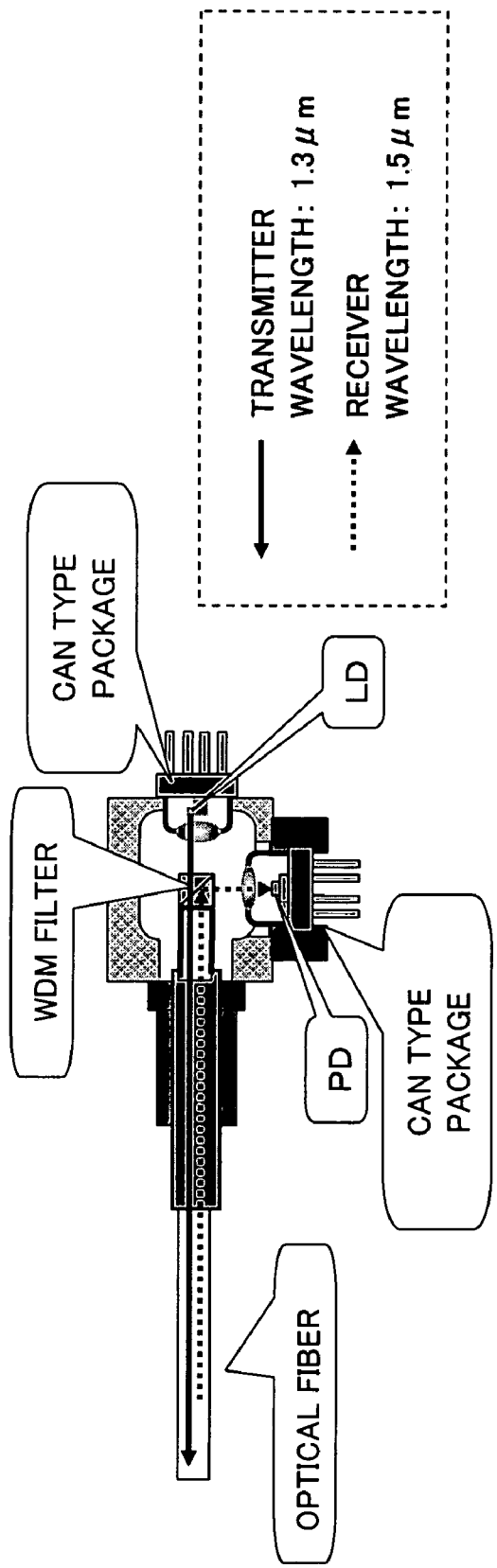
FIG. 2 is a diagram showing an internal structural example of an optical device (BIDI optical transmitting and receiving module) that is used as a PON module.
Figure 3:
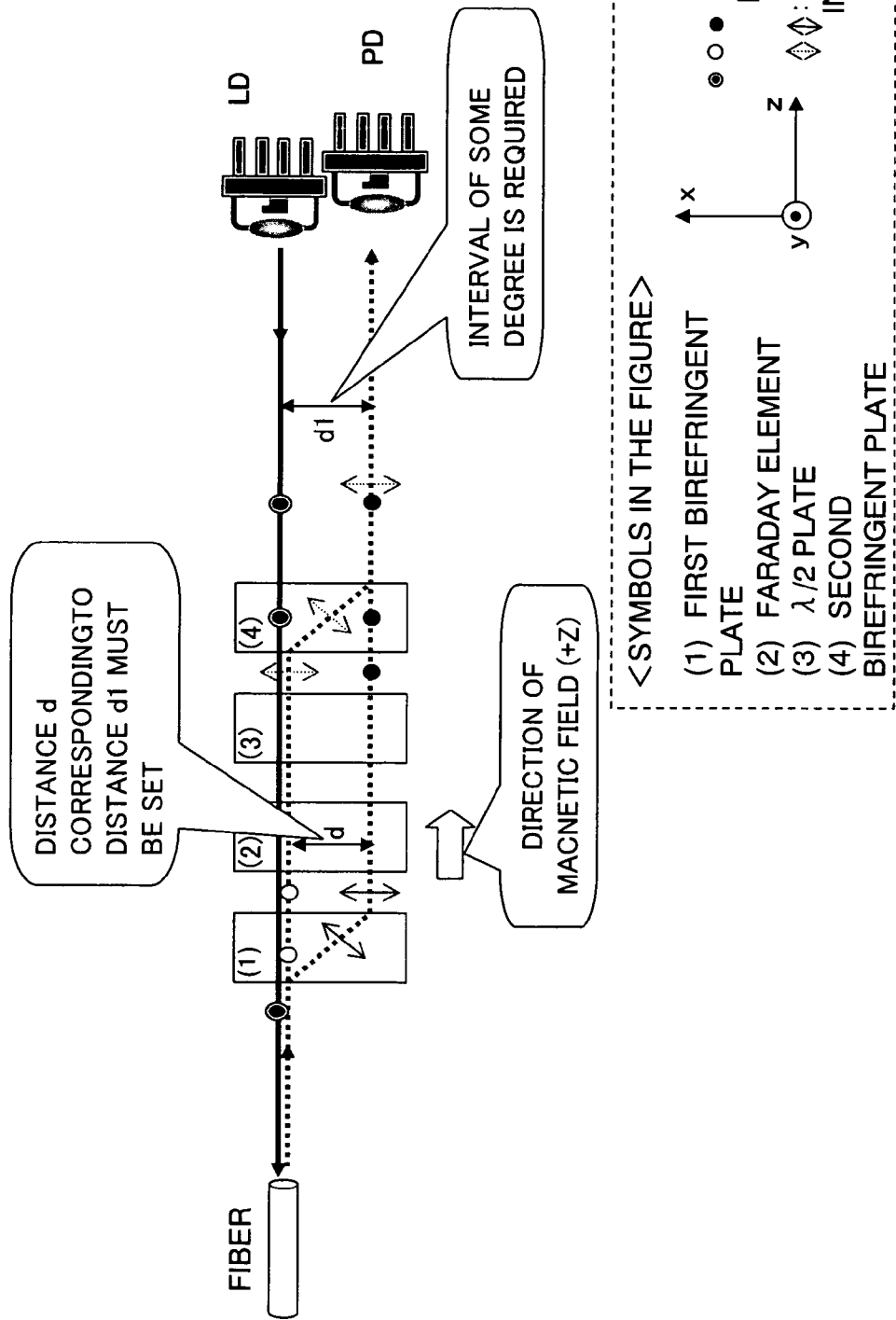
FIG. 3 is a diagram showing a structural example of a polarization independent optical isolator.
Figure 4:
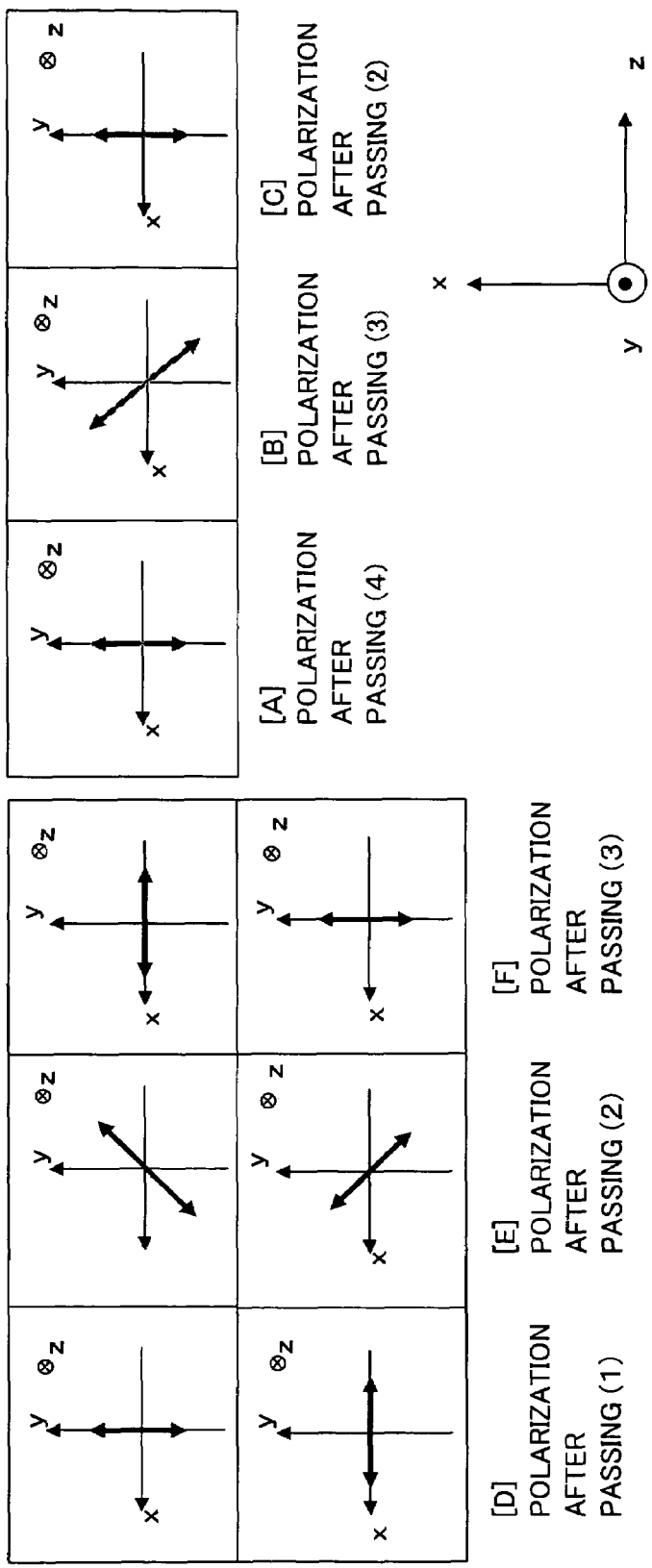
FIG. 4 is an explanatory diagram showing polarization states of the transmitter light and the receiver light in the polarization independent optical isolator shown in FIG. 3.
Figure 5:
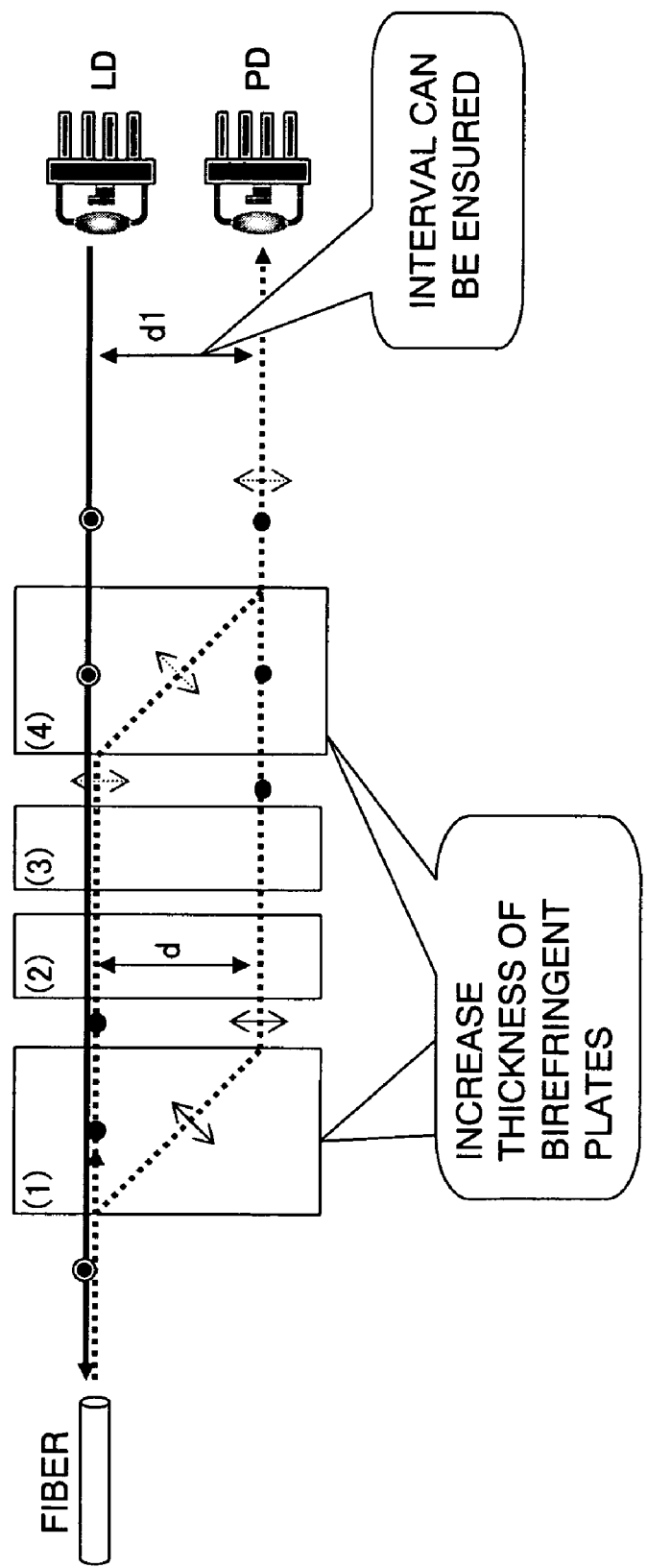
FIG. 5 is an explanatory diagram showing Prior Art 1 of the polarization independent optical isolator.
Figure 6:
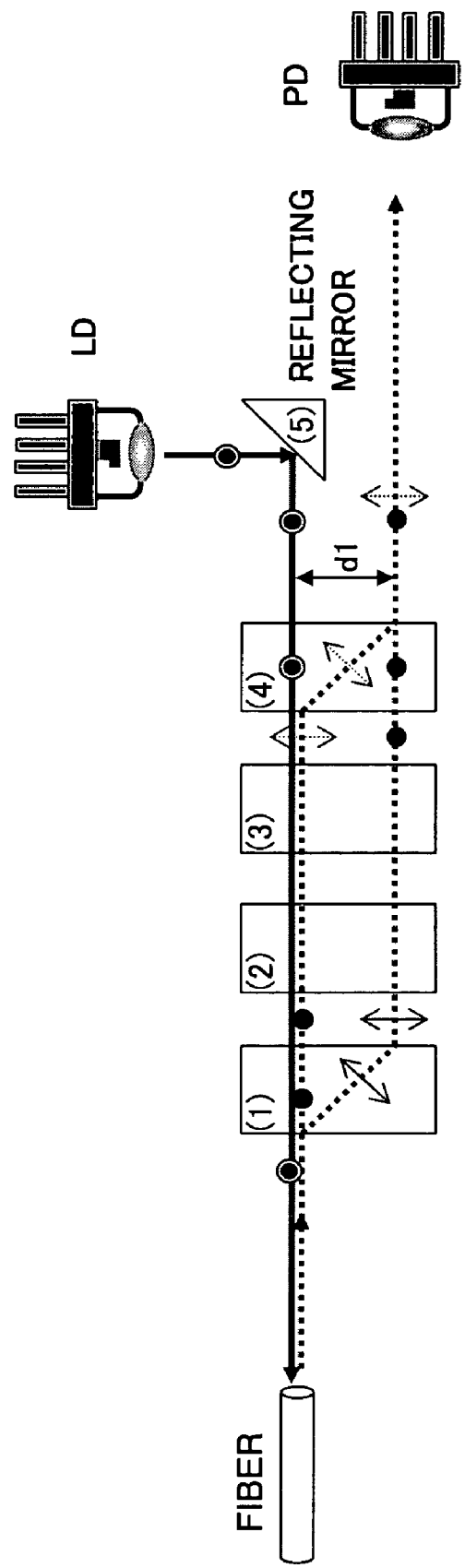
FIG. 6 is an explanatory diagram showing Prior Art 2 of the polarization independent optical isolator.

The Faraday element 2 rotates the polarization directions of the normal light and the abnormal light with respect to the direction of the magnetic field by 45 degrees (refer to FIG. 4E). The normal light R1 and the abnormal light R2 which are outputted from the Faraday element 2 are inputted to the λ/2 plate 3. The λ/2 plate 3 rotates the normal light R1 and the abnormal light R2 with respect to the light traveling direction by 45 degrees (refer to FIG. 4F). As a result, the normal light R1 and the abnormal light R2 are outputted in a state where those lights are rotated by substantially 90 degrees by means of the light rotation unit composed of the Faraday element 2 and the λ/2 plate 3.

The normal light R1 that is outputted from the λ/2 plate 3 is inputted to the polarization beam splitter 6, and the abnormal light R2 is inputted to the birefringent plate 4. The polarization beam splitter 6 makes the normal light R1 straightly travel as it is. Therefore, the normal light R1 is inputted to the birefringent plate 4 without reaching the LD.

In the birefringent plate 4, the normal light R1 becomes the abnormal light, and the abnormal light R2 becomes the normal light due to the polarization direction of the optical axis of the birefringent plate 4. For that reason, the normal light R1 is refracted and then outputted from a position that is displaced downward in parallel by the distance d. In this situation, the normal light R1 is combined with the abnormal light R2 that straightly travels as the normal light into one light, and is then outputted from an end surface (second end surface) of the birefringent plate 4, and received by the PD of the PD package 20.

In this situation, the reflected light (return light) of the receiver light from the PD package 20 straightly travels in a direction opposite to the forward direction (from the optical fiber F to the PD package 20). The reflected light is divided into the normal light and the abnormal light by means of the birefringent plate 4, travels backwardly in the optical paths of the normal light R1 and normal light R2, and reaches the birefringent plate 1. The normal light of the reflected light travels forwardly, passes through the λ/2 plate 3 and the Faraday element 2, and is then inputted to the birefringent plate 1. On the other hand, the abnormal light of the reflected light travels straightly through the polarization beam splitter 6, the λ/2 plate 3, and the Faraday element 2, and is then inputted to the birefringent plate 1.

In this situation, the normal light and the abnormal light are rotated by 45 degrees at the time of passing through the λ/2 plate 3, but are rotated by 45 degrees in a direction opposite to the rotating direction of the λ/2 plate 3 at the time of passing through the Faraday element 2. Therefore, the normal light and the abnormal light are inputted to the birefringent plate 1 in a state where the polarization directions thereof are not changed (not rotated) from those at the time of being outputted from the birefringent plate 4. Therefore, in the birefringent plate 1, the normal light travels straightly and is outputted without being refracted (refer to the normal light R3 in FIG. 8). On the other hand, the abnormal light is refracted upwardly and then outputted from a position that is displaced by the distance d (refer to the abnormal light R4 in FIG. 8). As a result, both of the normal light and the abnormal light (reflected light of the receiver light) are prevented from being combined together in the optical fiber F. Also, since the receiver light (normal light R1) in the forward direction travels straightly within the polarization beam splitter 6, the normal light R1 does not reach the LD.

The light (transmitter light: indicated by the solid arrow in FIG. 8) which is outputted from the LD of the LD package 10 is inputted to the input surface of the polarization beam splitter 6. The polarization beam splitter 6 bends the optical path of the transmitter light at a substantially right angle toward the λ/2 plate 3 side (fiber side), and then outputs the transmitter light. The polarization direction of the transmitter light is rotated by 45 degrees with respect to the light traveling direction by means of the λ/2 plate 3 (FIG. 4B). Then, the polarization direction of the transmitter light is rotated by 45 degrees with respect to the direction of the magnetic field by means of the Faraday element 2 (FIG. 4C). As a result, the polarization direction returns to a state of the polarization direction at the time of outputting the light from the LD. Therefore, since the transmitter light that is inputted to the birefringent plate 1 is the normal light, the transmitter light travels straightly within the birefringent plate 1, is outputted from the end surface thereof (the first end surface), and coupled (inputted) into the optical fiber F.

Second Embodiment

Figure 9:
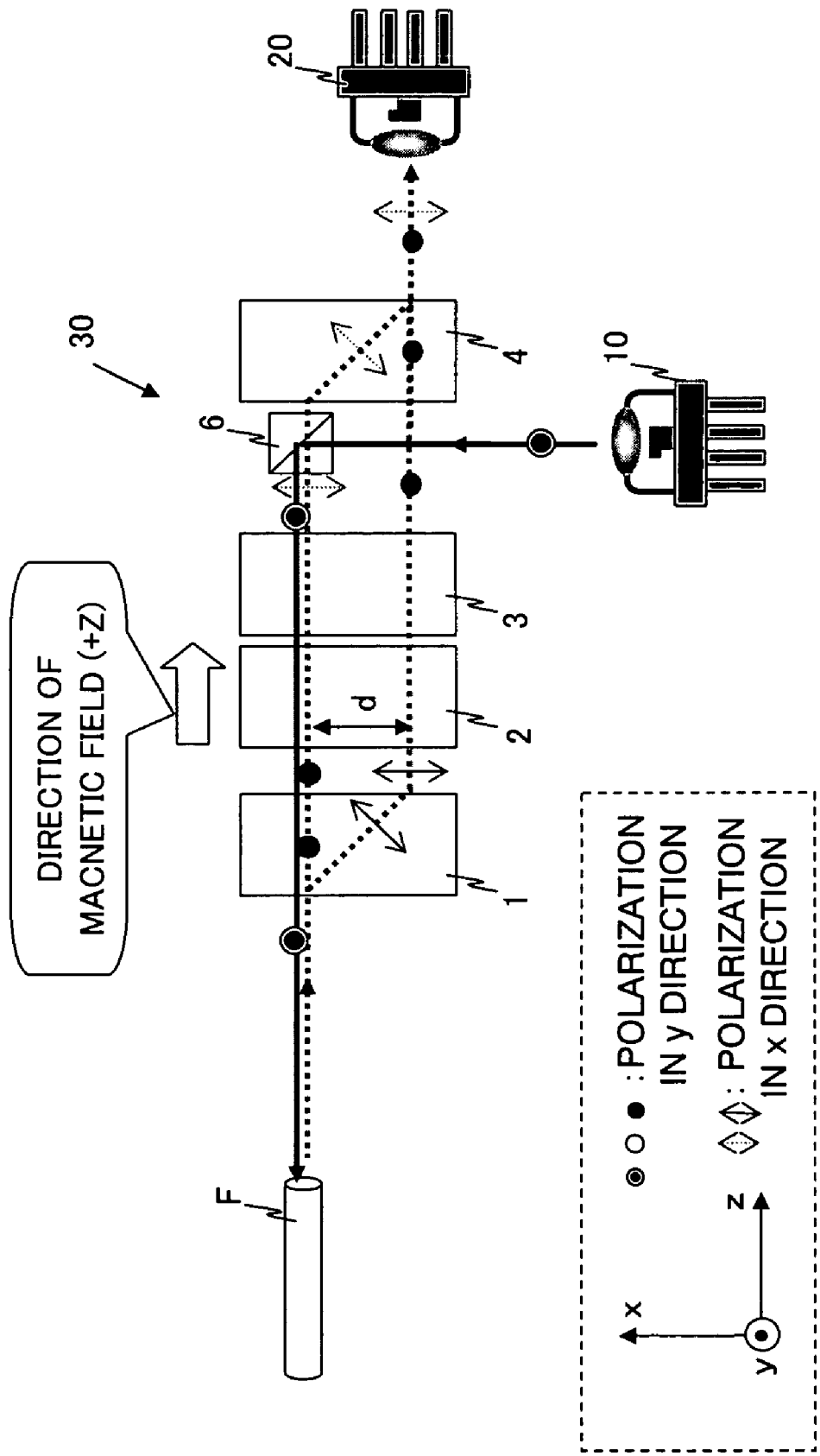
FIG. 9 is a diagram showing a structural example of an optical transmitting/receiving apparatus including the polarization independent optical isolator according to a second embodiment of the present invention.

FIG. 9 is a diagram showing a structural example of an optical transmitting/receiving apparatus according to a second embodiment of the present invention. In the optical transmitting/receiving apparatus shown in FIG. 8, the LD module 10 is disposed at the upper side of the optical isolator 30, whereas in the optical transmitting/receiving apparatus shown in FIG. 9, the LD module 10 is disposed at the lower side of the optical isolator 30. With this structure, the input direction of the transmitter light with respect to the polarization beam splitter 6 is different from that in the first embodiment. Except for the above-mentioned matters, the structure and operation of the optical transmitting/receiving apparatus (optical transmitter and receiver) according to the second embodiment are identical with those in the first embodiment, and therefore their description will be omitted.

Third Embodiment

Figure 10:
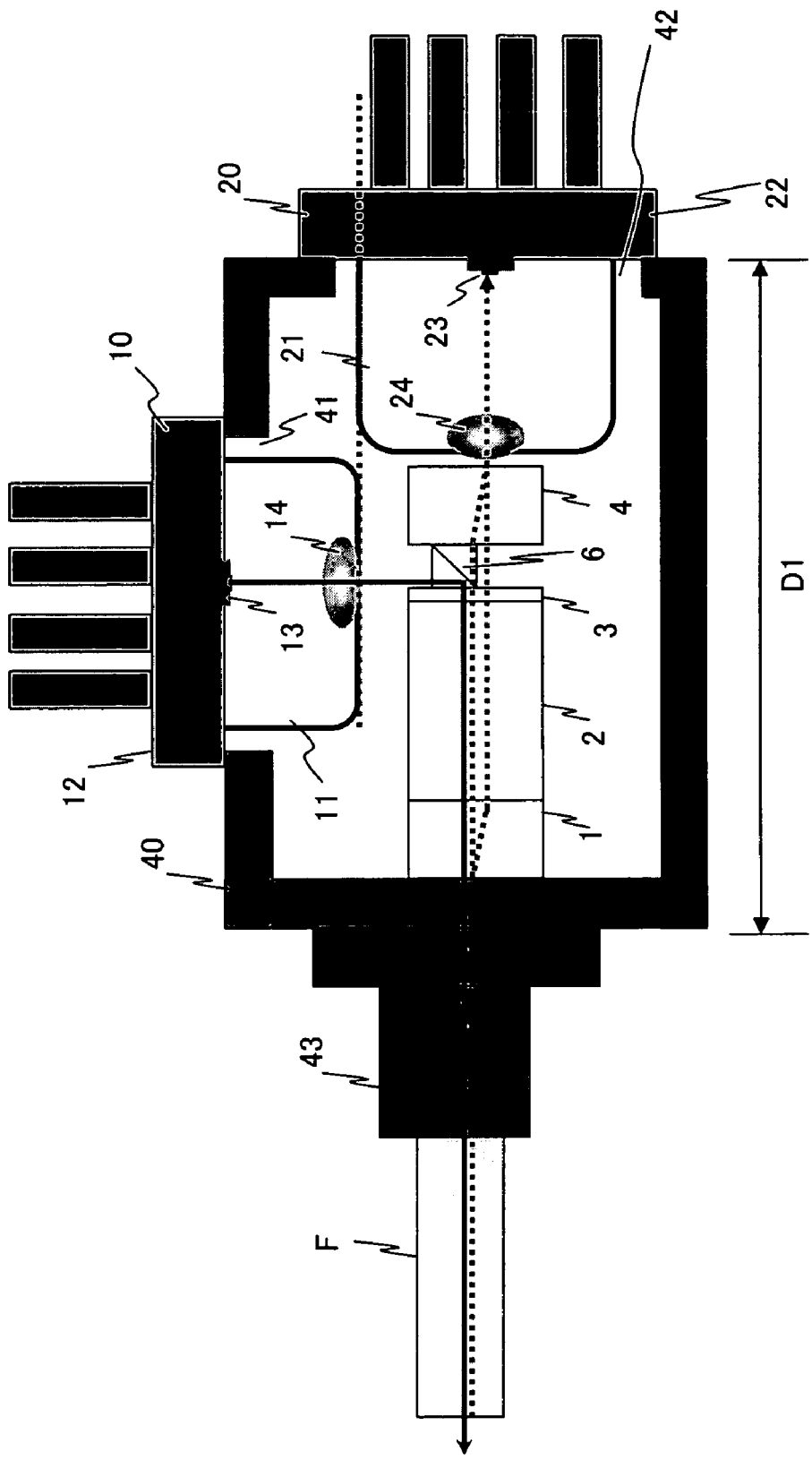
FIG. 10 is a diagram showing a structural example of an optical transmitting/receiving apparatus including the polarization independent optical isolator according to a third embodiment of the present invention.

FIG. 10 is a diagram showing a structural example of an optical transmitting/receiving apparatus according to a third embodiment of the present invention. FIG. 10 shows an example in which the LD package 10, the PD package 20, the optical isolator 30, and the optical fiber F which constitute the optical transmitting/receiving apparatus described in the first embodiment are structured integrally.

Referring to FIG. 10, the optical transmitting/receiving apparatus has a hollow boxy housing 40. The housing 40 includes opening portions 41 and 42 into which a CAN portion 11 of the LD package 10 and a CAN portion 21 of the PD package 20 are to be inserted, and the respective CAN portions 11 and 21 are inserted into the opening portions 41 and 42, respectively, and flange portions 12 and 22 of the respective packages 10 and 20 are abutted against the outer surface of the housing 40. The respective packages 10 and 20 are fixed to the housing 40 at the abutment portion. For example, the housing 40, and the flange portions 12 and 22 are made of metal, respectively, and fixed to each other by welding. Within the housing 40, the CAN portion 11 and the CAN portion 21 are orthogonal to each other in a state where the end surface of the CAN portion 11 and the side surface of the CAN portion 21 are disposed on the same line (a virtual line is indicated by a dashed line in FIG. 10).

An LD 13 and a lens 14 are disposed on the center axial line of the CAN portion 11 within the CAN portion 11, and the transmitter light that is outputted from the LD 13 is converged by the lens 14 into a collimated light and then inputted to the polarization beam splitter 6. On the other hand, a PD 23 and a lens 24 are disposed on the center axial line of the CAN portion 21 within the CAN portion 21, and the receiver light that has been converged by the lens 24 is received by the PD 23.

The optical isolator 30 is designed in such a manner that the birefringent plate 1, the Faraday element 2, the λ/2 plate 3, the polarization beam splitter 6, and the birefringent plate 4 are adhered to each other integrally, and for example, the birefringent plate 1 is adhered to the inner wall of the housing 40 so as to be fixed within the housing 40.

Also, a holder 43 is attached to the housing 40, and an end portion of the optical fiber F is inserted into the holder 43 so that the optical fiber F is fixedly supported by the holder 43. The end surface of the optical fiber F is disposed opposite to the end surface of the birefringent plate 1, the receiver light that is outputted from the end surface of the optical fiber F is inputted to the birefringent plate 1, and the transmitter light that is outputted from the birefringent plate 1 is inputted to the end surface of the optical fiber F.

Except for the above-mentioned matters, the structure and operation of the optical transmitting/receiving apparatus are identical with those in the first embodiment, and therefore their description will be omitted. In the first to third embodiments, the respective optical elements of the optical isolator 30 are so disposed as to be orthogonal to the transmitter light, and the surfaces of the respective optical elements may be slightly inclined with respect to the optical beam from the viewpoint of removing the return light (reflected light). Also, the Faraday element 2 and the λ/2 plate 3 as the light rotation unit may be reversed in the position. Also, not the normal light but the abnormal light may pass through the polarization beam splitter 6.

The optical transmitting/receiving apparatus shown in FIG. 10 is manufactured, for example, as follows. (1) The respective elements 1 to 4 and 6 of the optical isolator 30 including the polarization beam splitter 6 are combined together, and adhered to each other as necessary. (2) The end surface of the optical fiber F and the birefringent plate 1 of the optical isolator 30 are adhered to each other, and fitted into the housing 40 and the holder 43. (3) The optical axes of the LD package 10 and the PD package 20 are positioned with respect to the optical isolator 30, and then fixed to the housing 40 by welding.

Operation and Effects of the Embodiments

According to the optical transmitting/receiving apparatus of the first to third embodiments, the optical isolator 30 has the polarization beam splitter 6 that is inserted between the light rotation unit (the Faraday element 2 and the λ/2 plate 3) and the birefringent plate 4. In other words, the optical isolator 30 has the input surface (substantially orthogonal to the first and second end surfaces) of the transmitter light due to the polarization beam splitter 6 at an intermediate portion between the first end surface due to the birefringent plate 1 and the second end surface due to the birefringent plate 4, and the polarization beam splitter 6 prevents the receiver light from arriving at the LD and the transmitter light from being received by the PD. Also, the optical isolator 30 applies such the structure, thereby making it possible to displace the arrangement position of the LD package to the intermediate portion side of the optical isolator 30, and a distance between the optical isolator 30 and the PD package 20 can be reduced by the amount of the displacement while a non-contact state of the LD package 10 with the PD package 20 is maintained.

Figure 7:
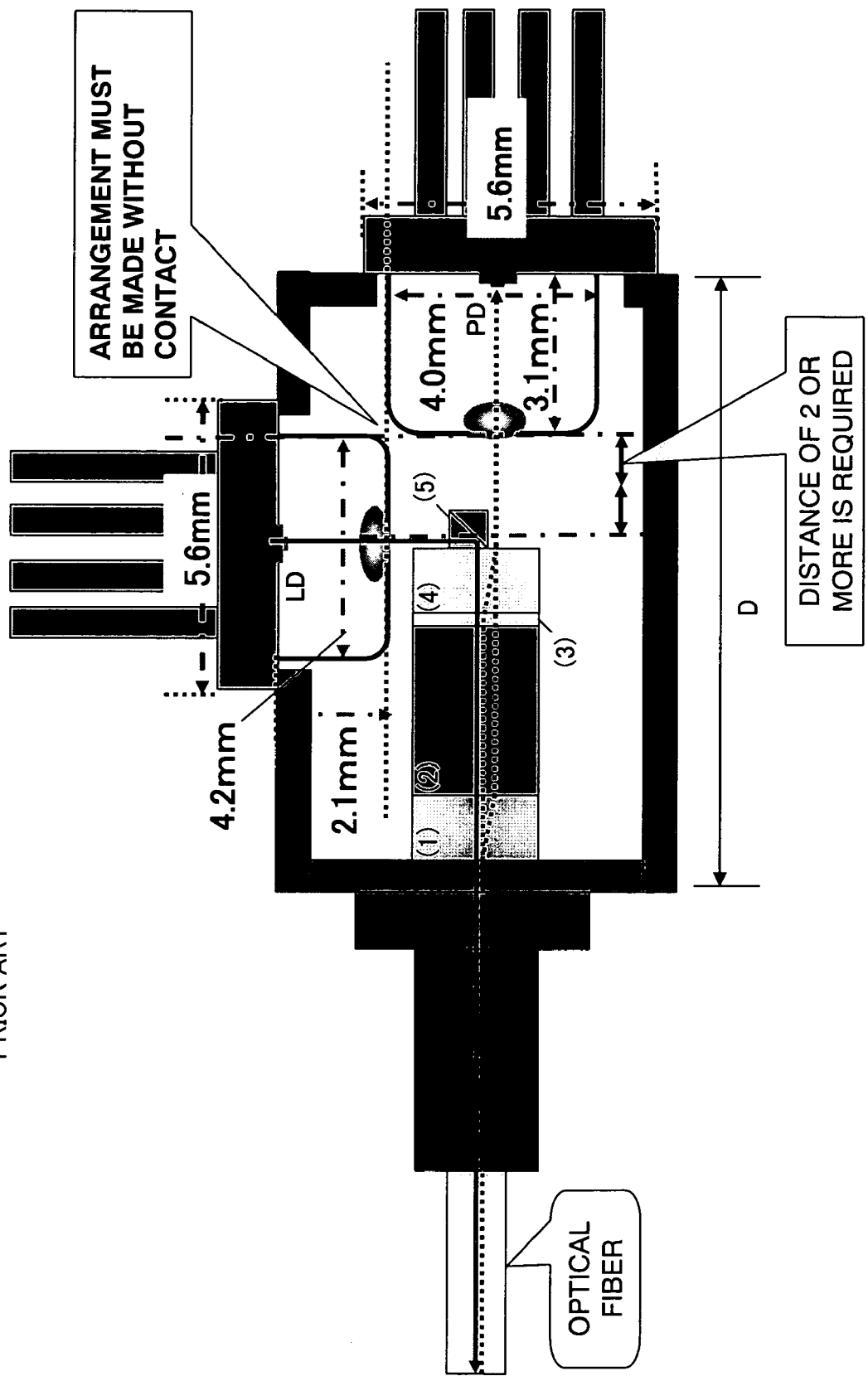
FIG. 7 is a diagram showing an installation example of Prior Art 2 and for explaining a problem with Prior Art 2.

The LD package 10 and the PD package 20 shown in FIG. 10 have the same size as those shown in FIG. 7. In Prior Art 2 shown in FIG. 7, an interval of about 2 mm is required between the reflecting mirror 5 and the PD package whereas in the third embodiment (FIG. 10), such the interval is not required between the birefringent plate 4 and the PD package 20. With this structure, a length D1 of the housing 40 in the optical axial direction can be shorter by about 1.3 mm than the length D in Prior Art 2 shown in FIG. 7. As a result, the size of the optical transmitting/receiving apparatus (optical device) can be reduced by about 10%.

Applied Example

Figure 11:
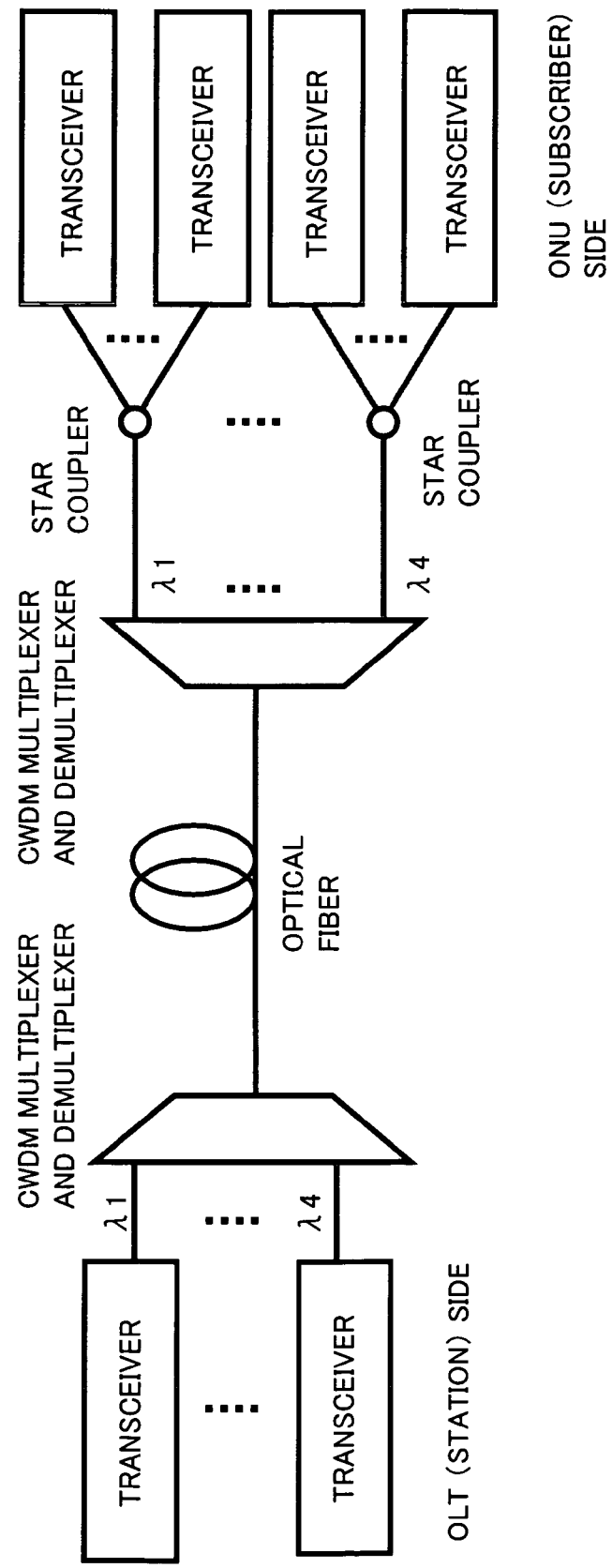
FIG. 11 is a diagram showing an example of the CWDM-PON system that uses the optical transmitting/receiving apparatus described in the first to third embodiments as a transceiver.

The optical transmitting/receiving apparatus described in the first and third embodiments can be applied to the transmitting/receiving apparatus (transceiver) of an optical signal which transmits and receives the optical signal having the same wavelength or the same wavelength band. FIG. 11 is a diagram showing a structural example of a CWDM (coarse wavelength division multiplexing)-PON system using the optical transmitting/receiving apparatus (transceiver).

In the PON system shown in FIG. 11, a plurality of transceivers corresponding to wavelengths λ1 to λ4 are disposed at the OLT (station) side, and the transmitter signals (transmitter light beams) of the respective transceivers are combined (multiplexed) by the CWDM multiplexer and demultiplexer, and inputted to the CWDM multiplexer and demultiplexer at the ONU (subscriber) side through the optical fiber. The CWDM multiplexer and demultiplexer divides the inputted multiplexed light into the transmitter lights of the wavelengths λ1 to λ4. The respective divided transmitter lights are further divided by the star coupler and received by the respective transceivers (subscribers). The lights are received by the transceiver at the station side from the transceivers of the respective subscribers through the optical paths described above in the opposite direction.

Others

The disclosures of Japanese patent application No. JP2006-221207 filed on Aug. 14, 2006 including the specification, drawings and abstract are incorporated herein by reference.

What is claimed is:

1. A polarization independent optical isolator, which: introduces receiver light inputted from an optical transmission path into a light receiving element; prevents reflected light of the receiver light from being inputted to the optical transmission path; and introduces transmitter light inputted from a light emitting element into the optical transmission path in a state where the transmitter light inputted from the light emitting element is not received in the light receiving element, the polarization independent optical isolator comprising:

a first birefringent plate that divides the receiver light inputted from the optical transmission path into normal light and abnormal light to output the normal light and the abnormal light;

a second birefringent plate that combines the normal light and the abnormal light which are divided by the first birefringent plate to output the combined light to the light receiving element;

an optical rotation unit that is disposed between the first birefringent plate and the second birefringent plate, rotates the polarization direction of the normal light and the abnormal light which are outputted from the first birefringent plate by substantially 90° and outputs the rotated light, and outputs the reflected light of the receiver light which is divided into the normal light and the abnormal light by the second birefringent plate in a state where the polarization direction of the reflected light is not rotated; and a polarizing element that is disposed between the optical rotation unit and the second birefringent plate, allows one of the normal light and the abnormal light which are inputted from the optical rotation unit to pass therethrough and to be inputted to the second birefringent plate, and outputs the transmitter light inputted from the light emitting element to the optical rotation unit.

2. An optical transmitting/receiving apparatus, comprising:

an optical transmission path;

a light receiving element that receives receiver light from the optical transmission path;

a light emitting element that outputs transmitter light to be inputted to the optical transmission path; and a polarization independent optical isolator that includes: a first birefringent plate that divides the receiver light inputted from the optical transmission path into normal light and abnormal light to output the normal light and the abnormal light; a second birefringent plate that combines the normal light and the abnormal light which are divided by the first birefringent plate to output the combined light to the light receiving element; an optical rotation unit that is disposed between the first birefringent plate and the second birefringent plate, rotates the polarization direction of the normal light and the abnormal light which are outputted from the first birefringent plate by substantially 90° and outputs the rotated light, and outputs the reflected light of the receiver light which is divided into the normal light and the abnormal light by the second birefringent plate in a state where the polarization direction of the reflected light is not rotated; and a polarizing element that is disposed between the optical rotation unit and the second birefringent plate, allows one of the normal light and the abnormal light which are inputted from the optical rotation unit to pass therethrough and to be inputted to the second birefringent plate, and outputs the transmitter light inputted from the light emitting element to the optical rotation unit.

3. An optical transmitting/receiving apparatus according to claim 2, wherein the light receiving element is received in a first CAN type package, wherein the light emitting element is received in a second CAN type package, and wherein the first CAN type package and the second CAN type package are disposed to be substantially orthogonal to each other in a non-contact state.

* * * * *